US012067764B2

(12) United States Patent
Moosaei et al.

(10) Patent No.: US 12,067,764 B2
(45) Date of Patent: Aug. 20, 2024

(54) BRAKE LIGHT DETECTION

(71) Applicant: Ford Global Technologies, LLC., Dearborn, MI (US)

(72) Inventors: Maryam Moosaei, Mishawaka, IN (US); Guy Hotson, Palo Alto, CA (US); Parsa Mahmoudieh, Vallejo, CA (US); Vidya Nariyambut Murali, Sunnyvale, CA (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 18/321,392

(22) Filed: May 22, 2023

(65) Prior Publication Data

US 2023/0290136 A1 Sep. 14, 2023

Related U.S. Application Data

(63) Continuation of application No. 17/829,938, filed on Jun. 1, 2022, now Pat. No. 11,694,430, which is a
(Continued)

(51) Int. Cl.
*G06V 10/82* (2022.01)
*G06V 10/764* (2022.01)
*G06V 20/58* (2022.01)

(52) U.S. Cl.
CPC ............ *G06V 10/82* (2022.01); *G06V 10/764* (2022.01); *G06V 20/584* (2022.01);
(Continued)

(58) Field of Classification Search
CPC .... G06V 10/82; G06V 10/764; G06V 20/584; G06V 20/56; G06T 2207/10004; G06T 2207/10016; G06T 2207/10024; G06T 2207/10028; G06T 2207/30248; G06T 2207/30252; G06T 7/90; G06T 1/0014;
(Continued)

(56) References Cited

U.S. PATENT DOCUMENTS 6,335,682 B1 * 1/2002 Bates ................. B60Q 1/52
340/479
11,227,409 B1 * 1/2022 Wu ..................... G06V 10/80

OTHER PUBLICATIONS

Martin Ester; Hans-Peter Kriegel; Jorg Sander; and Xiaowei Xu: "A Density-Based Algorithm for Discovering Clusters in Large Spatial Databases with Noise"; Aug. 1996; Proceedings of the 2nd International Conference on Knowledge Discovery and Data Mining, Portland, Oregon, USA; pp. 226-231 (Year: 1996).*

(Continued)

*Primary Examiner* — Siamak Harandi
(74) *Attorney, Agent, or Firm* — David R. Stevens; Stevens Law Group

(57) ABSTRACT

Systems, methods, and devices for detecting brake lights are disclosed herein. A system includes a mode component, a vehicle region component, and a classification component. The mode component is configured to select a night mode or day mode based on a pixel brightness in an image frame. The vehicle region component is configured to detect a region corresponding to a vehicle based on data from a range sensor when in a night mode or based on camera image data when in the day mode. The classification component is configured to classify a brake light of the vehicle as on or off based on image data in the region corresponding to the vehicle.

20 Claims, 5 Drawing Sheets

Related U.S. Application Data continuation of application No. 17/028,921, filed on Sep. 22, 2020, now Pat. No. 11,386,673, which is a continuation of application No. 16/261,300, filed on Jan. 29, 2019, now Pat. No. 10,853,673, which is a continuation of application No. 15/359,158, filed on Nov. 22, 2016, now Pat. No. 10,248,874.

(52) U.S. Cl.
CPC ............... *G06T 2207/10004* (2013.01); *G06T 2207/10016* (2013.01); *G06T 2207/10024* (2013.01); *G06T 2207/10028* (2013.01); *G06T 2207/30248* (2013.01); *G06T 2207/30252* (2013.01)

(58) Field of Classification Search
CPC ................... B60Q 1/44; B60R 21/013; B60R 2001/1253; B60R 2001/1284; B60R 2021/0004; B60R 2021/01259
See application file for complete search history.

(56) References Cited

OTHER PUBLICATIONS

Xueming Wang ; Jinhui Tang; Jianwei Niu; and Xiaoke Zhao: "Vision-based two-step brake detection method for vehicle collision avoidance"; 2016; Neurocomputing 173; pp. 450-461. (Year: 2016).*

* cited by examiner

BRAKE LIGHT DETECTION

CROSS REFERENCE TO RELATED PATENT APPLICATION

The present application is a continuation of U.S. patent application Ser. No. 17/829,938, filed Jun. 1, 2022, which is a continuation of U.S. patent application Ser. No. 17/028,921, filed on Sep. 22, 2020, which is a continuation of U.S. patent application Ser. No. 16/261,300, filed on Jan. 29, 2019, which is a continuation of U.S. patent application Ser. No. 15/359,158, filed on Nov. 22, 2016. All the foregoing are hereby incorporated by reference in their entirety.

TECHNICAL FIELD

The disclosure relates generally to methods, systems, and apparatuses for automatic brake light detection and more particularly relates to methods, systems, and apparatuses for day or night brake light detection using deep learning.

BACKGROUND

Automobiles provide a significant portion of transportation for commercial, government, and private entities. Autonomous vehicles and driving assistance systems are currently being developed and deployed to reduce an amount of user input required, or even eliminate user involvement entirely. For example, some driving assistance systems, such as crash avoidance systems, may monitor driving, positions, and a velocity of the vehicle and other objects while a human is driving. When the system detects that a crash or impact is imminent the crash avoidance system may intervene and apply a brake, steer the vehicle, or perform other avoidance maneuvers. As another example, autonomous vehicles may drive and navigate a vehicle with little or no user input. Autonomous vehicles and driving assistance systems should accurately detect objects and current conditions.

BRIEF DESCRIPTION OF THE DRAWINGS

Non-limiting and non-exhaustive implementations of the present disclosure are described with reference to the following figures, wherein like reference numerals refer to like parts throughout the various views unless otherwise specified. Advantages of the present disclosure will become better understood with regard to the following description and accompanying drawings where.

DETAILED DESCRIPTION

Figure 1:
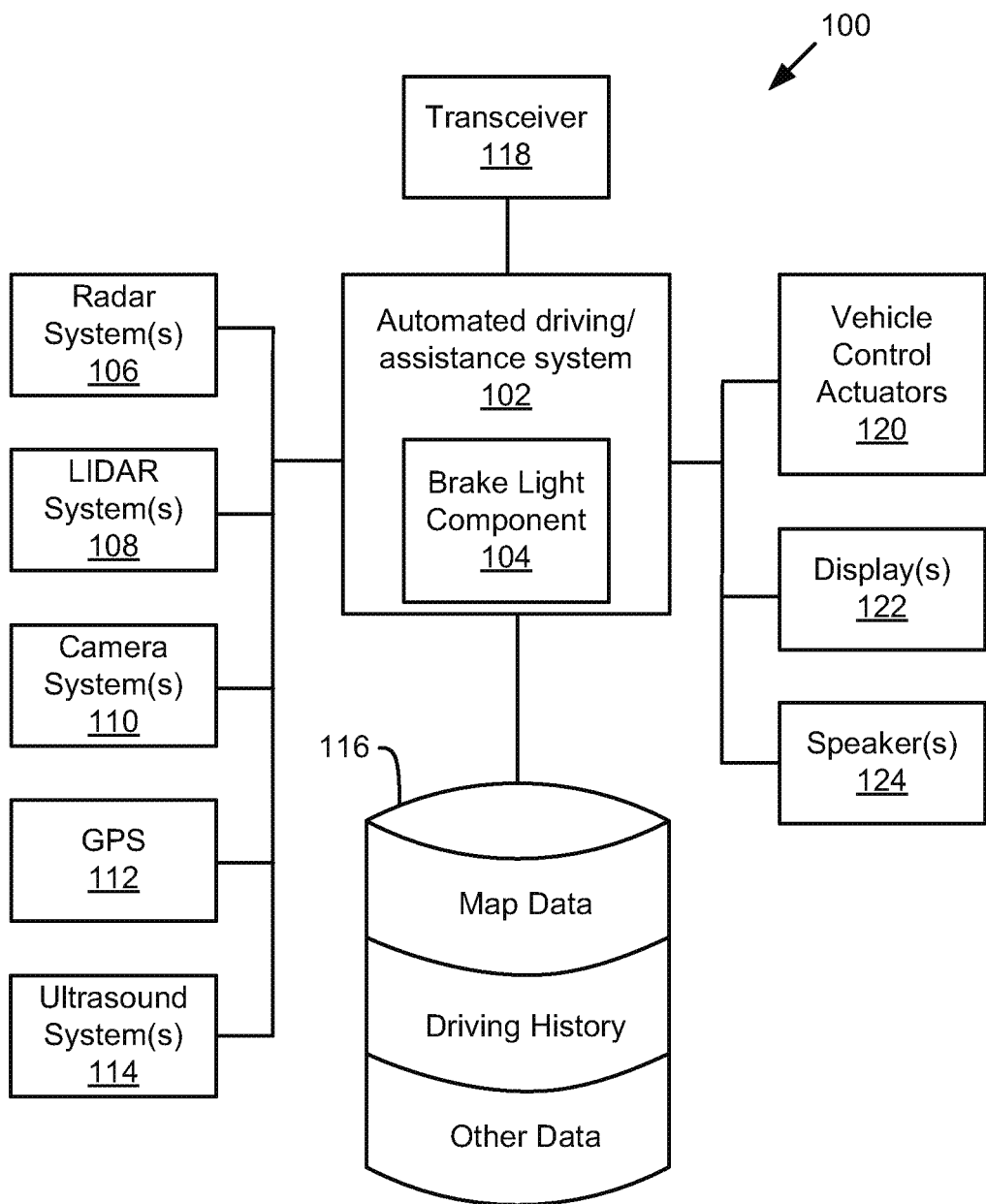
FIG. 1 is a schematic block diagram illustrating an implementation of a vehicle control system that includes an automated driving/assistance system.

Autonomous and assisted driving vehicles will need to know if a vehicle ahead of them is braking in order to slow down and keep a safe distance. Additionally, if a traffic light is recognized as green, but the vehicles ahead have their brake lights on, an autonomous vehicle should not attempt to pass the intersection. Similarly, when approaching an intersection with traffic lights that are broken or visually obscured (e.g., by a large vehicle in front of the autonomous vehicle), recognition of brake lights will enable the autonomous vehicle to infer when it is okay to go or move. In one embodiment, automatic brake light detection can also be incorporated into a driver assistance system for regular vehicles. For example, if a driver is distracted and does not notice that a vehicle ahead of the driver is braking, the system may alert the driver with audio/visual warnings.

Applicants have developed methods, systems, and devices for detecting brake lights and their state. In one embodiment, a system for detecting brake lights includes a mode component, a vehicle region component, and a classification component. The mode component is configured to select a night mode or day mode based on a pixel brightness in an image frame. The vehicle region component is configured to detect a region corresponding to a vehicle based on data from a range sensor when in a night mode or based on camera image data when in the day mode. The classification component is configured to classify a brake light of the vehicle as on or off based on image data in the region corresponding to the vehicle.

In one embodiment, computer vision is combined with deep learning to automatically detect brake lights of vehicles using light detection and ranging (LIDAR) data and camera data. Deep learning and computer vision may be used to detect whether the brake lights of the vehicle a head of an autonomous vehicle or a regular vehicle are on. This may help to not only keep a safe distance from the vehicle ahead, but may also help to safely pass an intersection.

In one embodiment, a system may detect whether to perform brake light detection using a day mode or a night mode. In one embodiment, the system determines an average intensity of the pixels in the upper part of an image frame. The average intensity may be calculated for every image frame or for one or more image frames in a time period, such as one or more images within a second time frame. If the pixel intensity is greater than a threshold, the system may determine to use a day mode and if the intensity is less than a threshold, the system may use a night mode.

The system may perform vehicle detection to identify where in an image frame a vehicle is located. In the day mode, the system may detect all the vehicles within each image (such as a red-green-blue "RGB" image) in order to identify regions of interests for brake light detection. In the day mode, this may be accomplished by first extracting feature maps from the RGB or RGB depth (RGB-D) (using LIDAR to create a depth map). Feature maps may include 2D mappings showing where image features that are good for identifying vehicles are located. These feature maps may be extracted using a deep convolutional architecture (e.g., the VGG16 network or GoogLeNet® network) without any fully connected classification layers. Potential vehicles objects may then be identified using feature maps from one or more preceding layers as inputs to region proposal and object classification layers. This network may be based on architectures such as those in "Faster R-CNN: Towards real-time object detection with region proposal networks. Advances in neural information processing systems" by Ren, S., He, K., Girshick, R., & Sun, J. (2015) (pp. 91-99) or "SSD: Single Shot MultiBox Detector", arXiv preprint arXiv: 1512.02325, Liu, W., Anguelov, D., Erhan, D., Szegedy, C., & Reed, S. (2015). The outputs of classification may include bounding boxes (e.g., regions of an image frame) that contain potential vehicles, along with corresponding confidences that vehicles are within these regions of the image. These regions are used as the input for the brake light detection.

In night mode, LIDAR is used for detecting vehicles (and/or their corresponding locations within image or LIDAR frames). Using LIDAR, candidates for vehicles may be found by using a density based clustering algorithm such as a density-based spatial clustering of applications with noise (DBSCAN) to cluster objects after removing the ground plane (e.g., points corresponding to a road surface). If the dimensions of a cluster are within a size range corresponding to a reasonable size of a vehicle, the cluster is fed into a trained deep neural network (DNN) with a deep architecture (such as VGG-16) to classify as a vehicle or not a vehicle. The trained DNN takes in a cluster of 3D points and makes a binary classification as whether the cluster corresponds to a vehicle or not. Regions detected as vehicle are used as the input for the brake light detection. In some embodiments, other types of range data may be used instead of LIDAR. For example, data from an ultrasound sensing system, radar system, or even range data derived from images may be used.

A system may process data within the regions corresponding to a vehicle (as determined by image recognition in the day mode or LIDAR clustering in the day mode). If the system is to process an image in a day mode, the system converts the image to HSV (hue, saturation, and value) color space. The system may filter the saturation channel with different sizes to account for different intensities of sunlight and different times of the day. For example, the saturation channel may be filtered with 3 different sizes (such as 100 pixels, 150 pixels, and 200 pixels) which would result in 3 different thresholded HSV images. For each of the three thresholded HSV images, contours in the frame or region corresponding to a vehicle are extracted. The shape and size of these contours may be used to filter out some of them. Any remaining candidates will be used as regions of interest (ROI) for detecting a state of a brake light. These ROI are fed to a deep neural network that is trained on a large dataset of brake lights. The output will be one of the two labels: positive (brake light on) and negative (brake light not on). The system may then draw a marker on all the detected brake lights. In one embodiment, the neural network may be similar to that disclosed in "Multi-column deep neural network for traffic sign classification", Ciressan, D., Meier, U., Masci, J., and Schmidhuber, J., Neural Networks, 32, 333-338. 23, 201 (2012). For example, a neural network like Ciressan may be modified to include two extra layers and change the size of kernels for processing brake lights.

In the night mode, the system may convert images into a lightness and two color channels (A and B) color space image (LAB). In one embodiment, the system filters the A channel with different sizes to account for different lighting conditions. For example, the A channel may be filtered with 3 different sizes (100 pixels, 150 pixels, and 200 pixels) to generate 3 different thresholded LAB images. For each of the three thresholded LAB images, contours are extracted. The shape and size of these contours may be used to filter out one or more of the contours. Any remaining candidates will be the ROI. The ROI may be fed to a DNN trained on a large dataset of brake lights. The output of the DNN may be either positive (brake light on) or negative (brake light not on). The system then draws a marker on all the detected brake lights.

In either day mode or night mode, if the system detects any brake lights ahead of the autonomous vehicle the system may provide a notification to a driving system or driver of the vehicle. For example, a notification to a driver may be in the form of a visual and/or audio warning message saying that the vehicle ahead of autonomous vehicle (or regular vehicle) is braking. As another example, the system may provide a notification to an automated driving system that a vehicle is braking, which may allow the automated driving system to take action (apply brakes, perform an avoidance maneuver, etc.).

Further embodiments and examples will be discussed in relation to the figures below.

Referring now to the figures, FIG. 1 illustrates an example vehicle control system 100. The vehicle control system 100 includes an automated driving/assistance system 102. The automated driving/assistance system 102 may be used to automate or control operation of a vehicle or to provide assistance to a human driver. For example, the automated driving/assistance system 102 may control one or more of braking, steering, acceleration, lights, alerts, driver notifications, radio, suspension damping, or any other driving or auxiliary systems of the vehicle. In another example, the automated driving/assistance system 102 may not be able to provide any control of the driving (e.g., steering, acceleration, or braking), but may provide notifications and alerts to assist a human driver in driving. For example, the automated driving/assistance system 102 may include one or more controllers that provide or receive data over a controller bus and use the data to determine actions to be performed and/or provide instructions or signals to initiate those actions.

The vehicle control system 100 also includes one or more sensor systems/devices for detecting a presence of nearby objects, lane markers, bumps, road texture, and/or or determining a location of a parent vehicle (e.g., a vehicle that includes the vehicle control system 100). For example, the vehicle control system 100 may include radar systems 106, one or more LIDAR systems 108, one or more camera systems 110, a global positioning system (GPS) 112, and/or ultrasound systems 114. The vehicle control system 100 may include a data store 116 for storing relevant or useful data such as vehicle information (model information or vehicle performance characteristics), map data, a driving history (i.e., drive history), or other data. The vehicle control system 100 may also include a transceiver 118 for wireless communication with a mobile or wireless network, other vehicles, infrastructure, cloud or remote computing or storage resources, or any other communication system.

The vehicle control system 100 may include vehicle control actuators 120 to control various aspects of the driving of the vehicle such as electric motors, switches or other actuators, to control braking, acceleration, steering, suspension, or the like. The vehicle control system 100 may include one or more displays 122, speakers 124, or other devices so that notifications to a human driver or passenger may be provided. A display 122 may include a heads-up display, dashboard display or indicator, a display screen, or any other visual indicator, which may be seen by a driver or passenger of a vehicle. The speakers 124 may include one or more speakers of a sound system of a vehicle or may include a speaker dedicated to driver notification. The vehicle control actuators 120, displays 122, speakers 124, or other parts of the vehicle control system 100 may be controlled by one or more of the controllers of the automated driving/assistance system 102.

In one embodiment, the automated driving/assistance system 102 only provides assistance and vehicle control during driving by a human driver. In one embodiment, the automated driving/assistance system 102 is configured to control driving or navigation of a parent vehicle. For example, the automated driving/assistance system 102 may control the vehicle control actuators 120 to drive a path within lanes on a road, parking lot, driveway or other location. For example, the automated driving/assistance system 102 may determine a path based on information or perception data provided by any of the components 106-118. The sensor systems/devices 106-110 and 114 may be used to obtain real-time sensor data so that the automated driving/assistance system 102 can assist a driver or drive a vehicle in real-time. In one embodiment, the automated driving/assistance system 102 also uses information stored in a driving history (locally or remotely) for determining conditions in a current environment. The automated driving/assistance system 102 may implement one or more algorithms, applications, programs, or functionality that drive or assist in driving of the vehicle.

The automated driving/assistance system 102 may include a brake light component 104 for detecting brake lights and/or the state of a brake light. In one embodiment, the brake light component 104 may identify sub-regions of an image that correspond to a vehicle and may also determine bounding boxes within the sub-region that correspond to brake lights of the vehicle. Image data within the bounding boxes may be processed using a deep neural network to classify a brake light as being on or off.

It will be appreciated that the embodiment of FIG. 1 is given by way of example only. Other embodiments may include fewer or additional components without departing from the scope of the disclosure. Additionally, illustrated components may be combined or included within other components without limitation.

Figure 2:
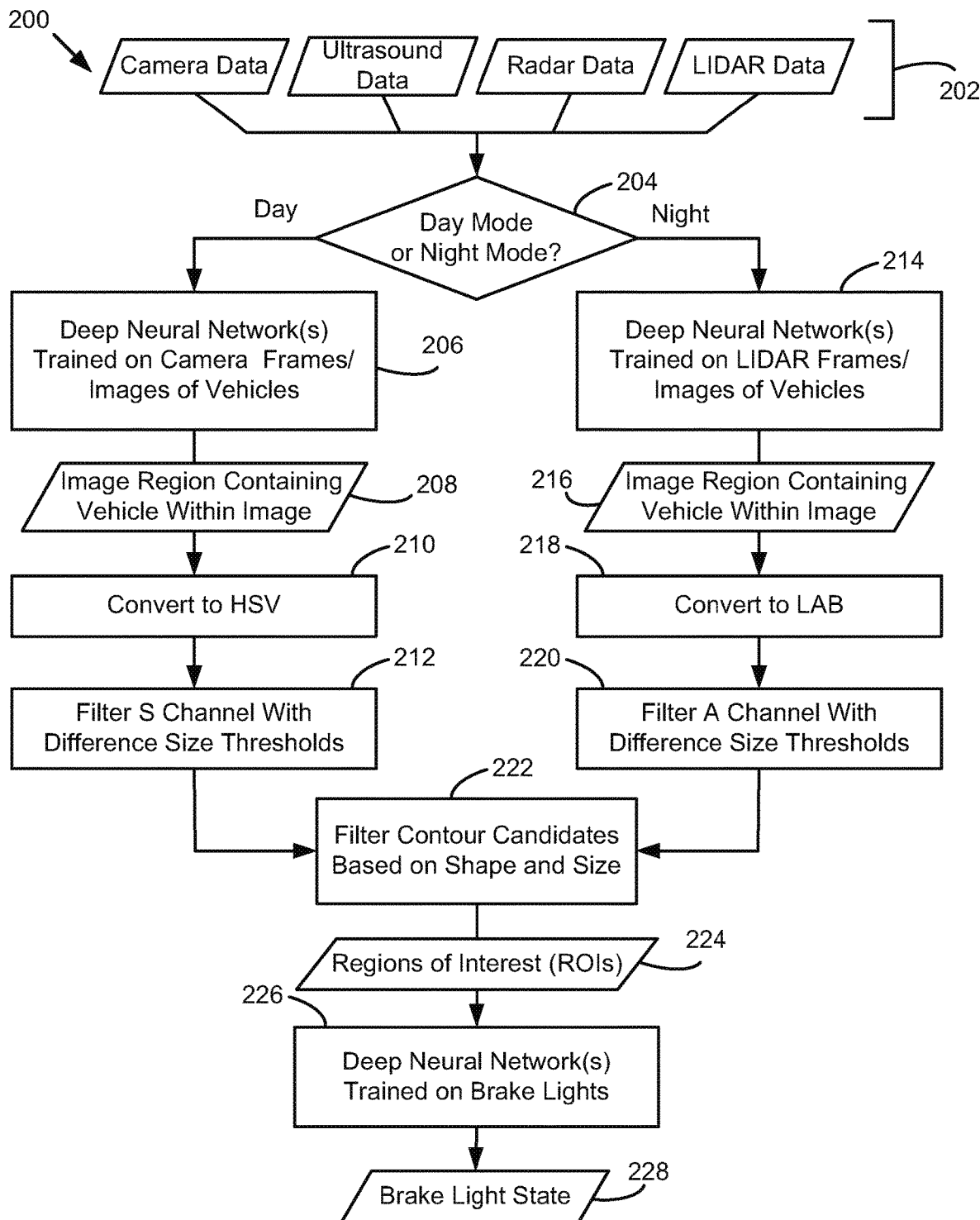
FIG. 2 is a schematic block diagram illustrating a method for brake light detection, according to one implementation.

FIG. 2 is a schematic flow chart diagram illustrating a method 200 for detecting brake lights. The method 200 may be performed by the automated driving system 102 and/or the brake light component 104 of FIG. 1.

Input data 202 may be provided as input to the system. The input data 202 includes camera data as well as range data. The range data may come from, or be generated based on, a camera data, an ultrasound data, radar data, and/or LIDAR data. Based on the input data 202, the brake light component 104 determines at 204 whether to process data in a day mode or night mode. For example, the brake light component 104 may use a day mode if the average brightness of pixels in an upper region of a camera image is greater than a threshold value (Day at 204). Similarly, the brake light component 104 may use a night mode if the average brightness of pixels in an upper region of a camera image is less than a threshold value (Night at 204).

In the day mode, the brake light component 104 may process camera images using one or more DNNs 206 that were trained on images or frames that include vehicles. The DNNs 206 output one or more image regions 208 containing vehicles. For example, these image regions 208 may include data within bounding boxes within an original image or frame where the vehicles are located. The brake light component 104 converts at 210 an image into an HSV format and filters at 212 an S channel with difference size thresholds. For example, the brake light component 104 may filter the S channel with various pixel sizes (such as a 100, 150, 200 or other pixel size). HSV format may work well for daylight images because the S channel (saturation channel) can be effective for detecting bright or shiny objects in daytime images.

In the night mode, the brake light component 104 may process range data (such as LIDAR data or any other range data) using one or more DNNs 214 that were trained on range data images or frames that include vehicles. The DNNs 214 output one or more image regions 216 containing vehicles. For example, the DNNs 214 may perform clustering to identify clusters of 3D points in the range data that likely correspond to a vehicle. Based on the clusters of range data points, the regions 216 of a camera image that correspond to range data clusters can be identified and output. For example, these image regions 216 may include data within bounding boxes within an original image or frame where the vehicles are located. The brake light component 104 converts at 218 an image into an LAB format and filters at 220 an A channel with difference size thresholds. For example, the brake light component 104 may filter the A channel with various pixel sizes (such as a 100, 150, 200 or other pixel size). LAB format may work well for night-time images because the A channel can be effective for detecting bright or shiny objects in dark or night-time lighting conditions.

For each of the thresholded images generated in the night mode or day mode (e.g., as generated at 212 or 220), the brake light component 104 extracts contours and filters at 222 the contour candidates based on shape and size. For example, the contours may be filtered to remove contours that have a shape or size that likely does not correspond to the size of a brake light. In one embodiment, different contouring and filtering algorithms may be used for the night or day mode images. After filtering at 222, any regions of interest 224 are processed using DNNs 226 trained on brake light images. The DNNs 226 may only be used to process the regions of interest to reduce the amount of processing power and increase speed in classification. Different neural networks may be used for day mode images and night mode images. In response to processing with the DDNs 226, the DNNs 226 output a brake light state 228 for each detected vehicle and/or brake light. The brake light state 228 may be positive, indicating that a brake light is lit, or negative, indicating that the brake light is not lit. This information can be provided to a human driver or automated driving system so that driving maneuvers can account for this condition.

Figure 3:
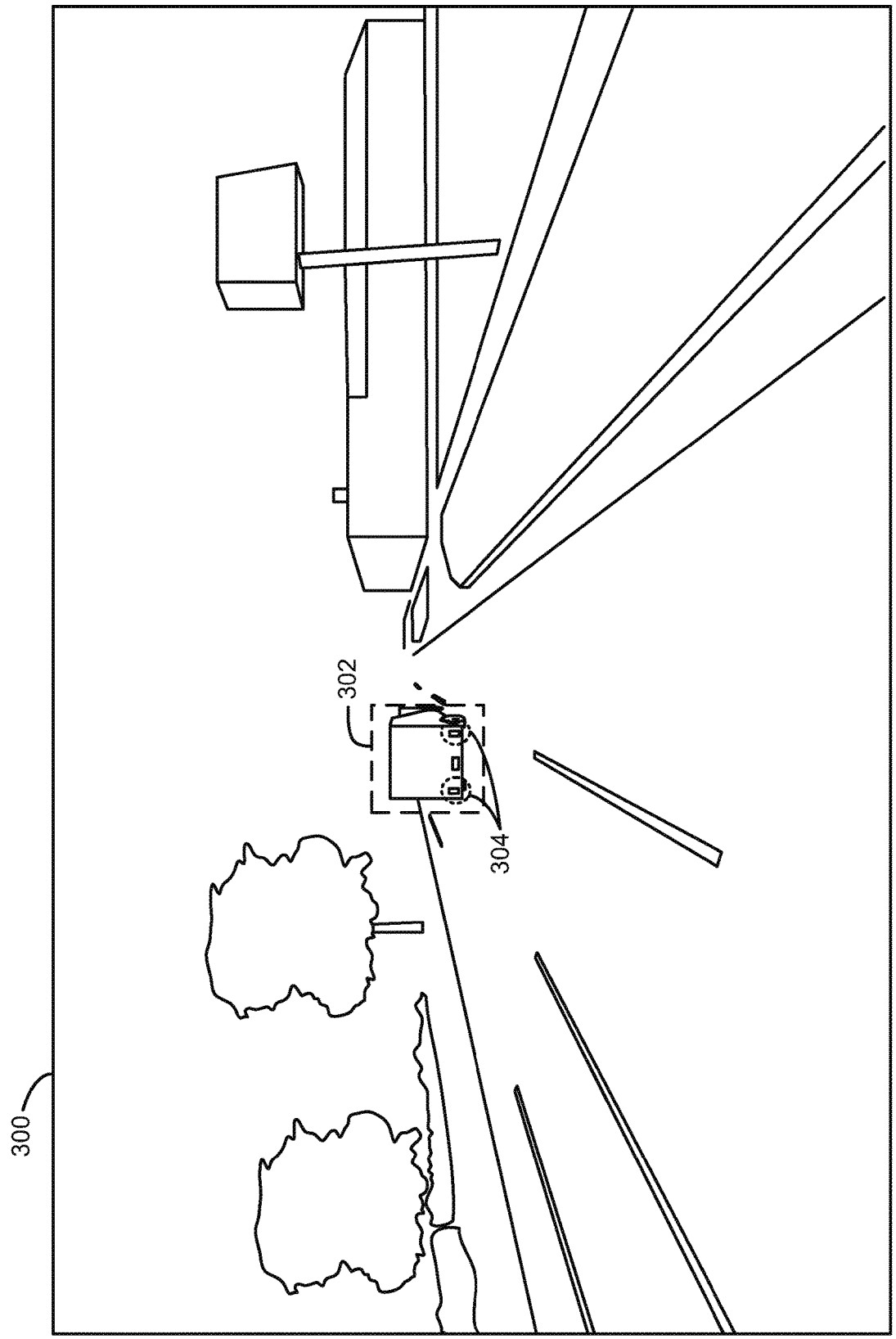
FIG. 3 illustrates a perspective view of a vehicle on a roadway with bounding boxes for a vehicle and brake lights, according to one implementation.

FIG. 3 illustrates an image 300 of a roadway, which may be captured by a vehicle, according to one embodiment. A vehicle bounding box 302 is shown around a vehicle located ahead of the vehicle comprising the brake light component 104. The vehicle bounding box 302 may correspond to the image regions 208, 216 as discussed in relation to FIG. 2. For example, the brake light component 104 may identify the vehicle in the vehicle bounding box 302 using an image (in day mode) or range data (such as LIDAR in night mode). Brake light bounding boxes 304 are also shown surrounding brake lights of the vehicle within the vehicle bounding box 302. In one embodiment, only image data within the vehicle bounding box 302 may be processed for contours to detect regions of interest that may contain brake lights. This can provide significant increases in efficiency as well as reduced processing time, both of which can be important in automotive applications. Upon determining the brake light bounding boxes 304, the data within the brake light bounding boxes 304 may be processed to determine whether a brake light is on (positive) or off (negative). For example, a DNN may be used to classify the brake light within a brake light bounding box 304 as on or off.

Figure 4:
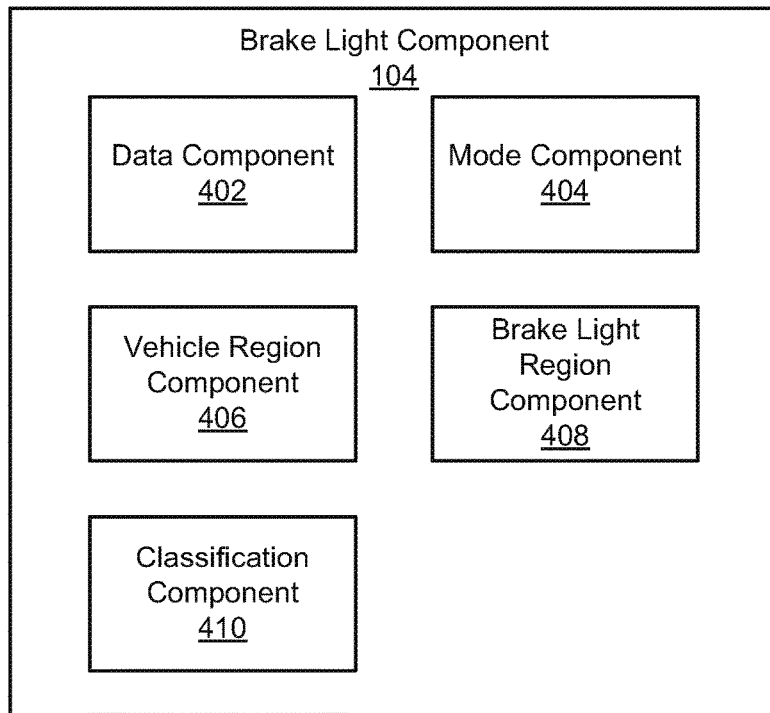
FIG. 4 is a schematic block diagram illustrating example components of a brake light component, according to one implementation.

Turning to FIG. 4, a schematic block diagram illustrating components of a brake light component 104, according to one embodiment, is shown. The brake light component 104 includes a data component 402, a mode component 404, a vehicle region component 406, a brake light region component 408, and a classification component 410. The components 402-410 are given by way of illustration only and may not all be included in all embodiments. In fact, some embodiments may include only one or any combination of two or more of the components 402-410. For example, some of the components 402-410 may be located outside the brake light component 104, such as within the automated driving/ assistance system 102.

The data component 402 is configured to obtain camera image data and range data for a region near a vehicle. See, for example, method 200 at 202 of FIG. 2. For example, the data component 402 may obtain camera frames and images captured by a camera, such as a forward facing camera of the vehicle. The data component 402 may also capture range data such as data that indicates a distance to one or more points in space in an environment around the vehicle. The range data may include range data obtained or generated by a LIDAR system, radar system, ultrasound sensing system, or the like. In one embodiment, the range data may include range data generated based on image data. However, range data generated from image data may take more processing time and/or may not be as accurate in low light conditions. In one embodiment, the data component 402 may obtain or generate image data that has a range (distance) associated with each pixel or one or more pixels within the image. For example, a visible light spectrum image may have distances associated with one or more pixels in the image.

The mode component 404 is configured to select a night mode or a day mode for detecting vehicles and/or brake lights of vehicles. See, for example, method 200 at 204 in FIG. 2. In one embodiment, the mode component 404 processes each image frame that will be used for brake light detection and selects a day mode or night mode for that image. The mode component 404 may select the mode based on a brightness of a portion of the pixels of an image. For example, the mode component may determine an average pixel intensity for a number of rows at the top of the image frame. Based on the average pixel intensity being above or below a threshold, the mode component 404 may select a day mode (average pixel intensity above the threshold) or a night mode (average pixel intensity below the threshold). Selecting a proper mode may allow for more accurate vehicle detection, and thus more accurate brake light detection.

The vehicle region component 406 detects a region corresponding to a vehicle. See, for example, method 200 at 206, 208, 214, and 216. If the mode component 404 has selected a night mode, the vehicle region component 406 may detect vehicles based on data from a range sensor. In the night mode, the vehicle region component 406 may use a clustering algorithm or DNN to detect a cluster of 3D points that likely correspond to a vehicle. In one embodiment, the vehicle region component 406 identifies 2D pixel locations within a camera image that correspond to the 3D points that have been identified as corresponding to a location of a vehicle. For example, the vehicle region component 406 may map 3D points in the range data that correspond to a vehicle to 2D points in camera image data to create a vehicle bounding box.

In a day mode, the vehicle region component 406 may use computer vision algorithms or methods to detect vehicles. If light is sufficient, the day mode may allow for greater range in detecting vehicles. However, if the light is insufficient, range data from LIDAR, radar, or the like may provide higher accuracy in detecting vehicles. In one embodiment, both range data and image data may be used to detect vehicles during the night mode or in the day mode. In both the day mode and the night mode, a 2D location or bounding box for a vehicle may be generated.

The brake light region component 408 detects regions within an image that correspond to brake lights of a vehicle. See, for example, method 200 at 210, 212, 218, 220, 222, and 224 of FIG. 2. In one embodiment, the brake light region component 408 determines one or more brake light bounding boxes that indicate a location within a camera image where brake lights of a vehicle are likely located. In one embodiment, the brake light region component 408 determines the brake light bounding boxes by extracting contours in regions corresponding to vehicles (e.g., as determined by the vehicle region component 406). The brake light region component 408 may also filter or select a subset of these contours based on their shape or size. For example, the brake light region component 408 may identify contours that have a shape and size that correspond to an expected brake light shape or size. In one embodiment, the shape and size of contours may be predetermined or trained based on images of vehicles and/or brake lights.

In one embodiment, determining the contours may be performed using different image formats depending on whether a day mode or a night mode is selected. For example, in a day mode, an RGB image may be converted into HSV color space for contour detection. In night mode, an RGB image may be converted into LAB color space for contour detection. Once contours are detected, a corresponding brake light bounding box may be determined image data (in RGB or other format) may then be provided to the classification component 410 for classification of the brake light as on or off.

The classification component 410 classifies a brake light as on or off. See, for example, method 200 at 224, 226 of FIG. 2. In one embodiment, the classification component 410 processes camera image data within a region determined by the brake light region component 408. For example, the classification component 410 may include or use a DNN to processes the image data in a brake light bounding box and classify the brake light as on or off. In one embodiment, the DNN used may depend on whether the mode component 404 selected. For example, one or more DNNs may be used to process day mode images while one or more other DNNs may be used to process night mode images. The classification component 410 may provide the results of a classification of a brake light or a vehicle to a vehicle control system 100 for notifying a human driver or for automated driving decision making.

Figure 5:
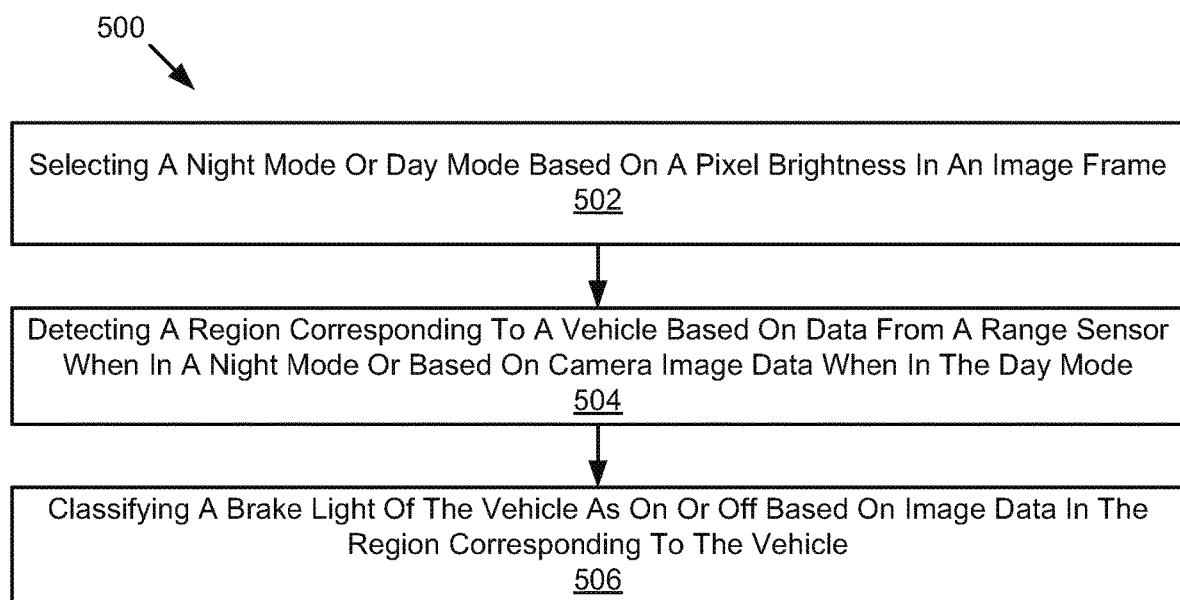
FIG. 5 is a schematic flow chart diagram illustrating a method for brake light detection, according to one implementation.

FIG. 5 is a schematic flow chart diagram illustrating a method 500 for detecting brake lights and their state. The method 500 may be performed by a brake light component or vehicle control system, such as the brake light component 104 of FIG. 1 or 4 or the vehicle control system 100 of FIG. 1.

The method 500 begins and a mode component 404 selects at 502 a night mode or day mode based on a pixel brightness in an image frame. The mode component 404 may select at 502 the night mode or day mode based in the pixel brightness in the upper portion of an RGB frame. For example, the upper portion may correspond to the sky or another area above the vehicle. If the area in the upper portion of the image is above a threshold, the method 500 may continue in a day mode. If the area in the upper portion of the image is below a threshold, the method 500 may continue in a night mode.

A vehicle region component 406 detects at 504 a region corresponding to a vehicle based on data from a range sensor when in a night mode or based on camera image data when in the day mode. For example, in the night mode, the vehicle region component 406 may detect at 504 a vehicle using a clustering algorithm to identify clusters of range data points that likely correspond to a vehicle. The vehicle region component 406 may then associate the location of the cluster of points with a corresponding region of a camera image to produce a vehicle region or vehicle bounding box indicating where a vehicle is likely located in a camera image. A DNN may be used to detect 3D point clusters within the range data (e.g., LIDAR data) that correspond to a vehicle. As another example, in the day mode, the vehicle region component 406 may detect at 504 a vehicle using image recognition on an image captured by a camera. The vehicle region component 406 may then generate a vehicle region or vehicle bounding box that contains the vehicle within a camera image. A DNN may be used to detect the vehicle, its size, and/or its location within the image. Thus, whether the day mode or night mode is used, a vehicle is detected and/or located in a camera image and region or bounding box is determined that contains the vehicle. Using range data, such as from LIDAR, can allow for more accurate and dependable detection of vehicles during dark or night-time driving conditions.

A classification component 410 classifies at 506 a brake light of the vehicle as on or off based on image data in the region corresponding to the vehicle. Classification at 506 may be performed using a DNN that has been trained on day and/or night brake light images. Because the classification at 506 is performed on only smaller regions that likely contain brake lights, significantly smaller and easier to train DNNs may be used, leading to reduced training costs, faster processing times, and increased efficiency. In one embodiment, a bounding box for a brake light is also located within the region corresponding to the vehicle to further increase processing efficiency.

Figure 6:
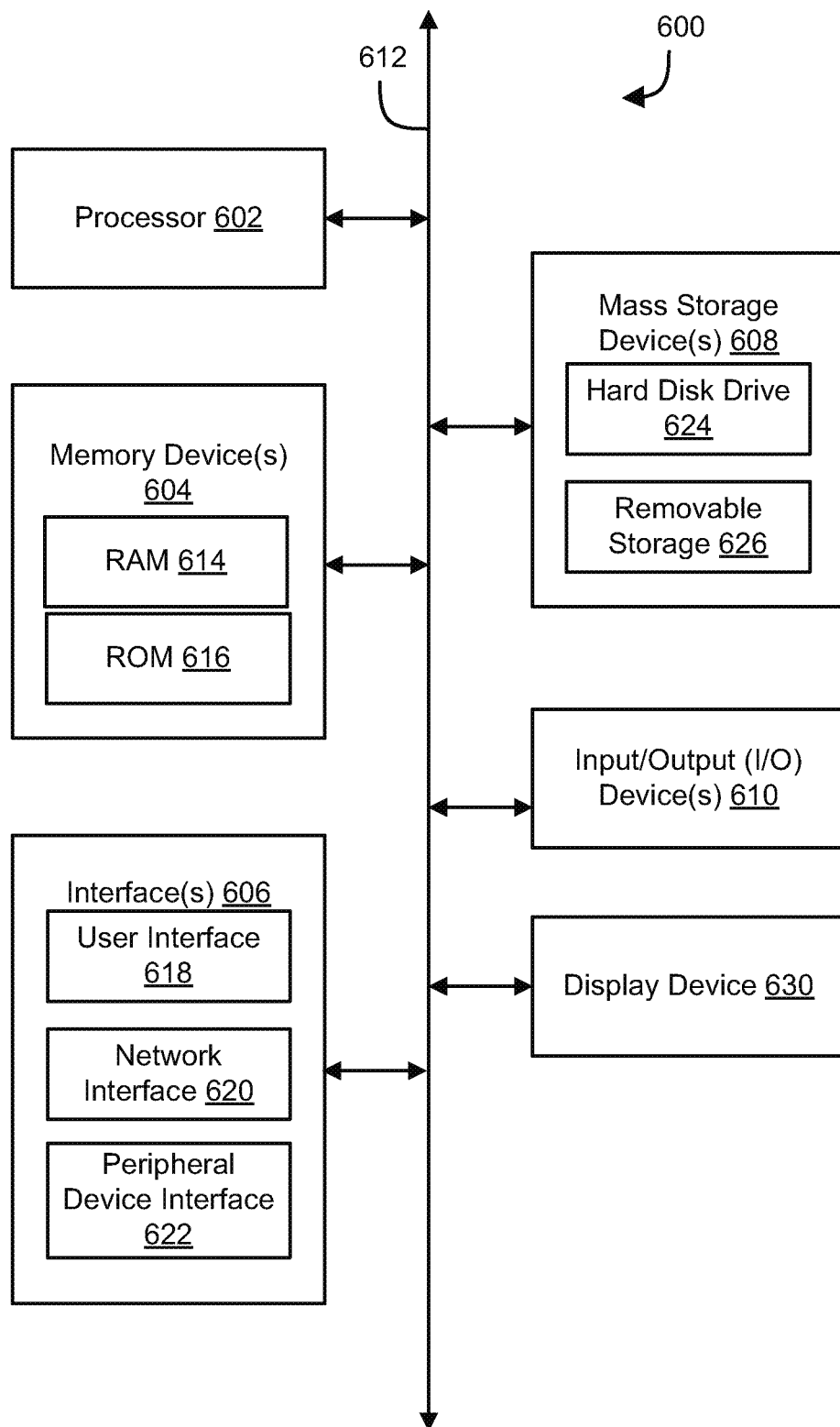
FIG. 6 is a schematic block diagram illustrating a computing system, according to one implementation.

Referring now to FIG. 6, a block diagram of an example computing device 600 is illustrated. Computing device 600 may be used to perform various procedures, such as those discussed herein. Computing device 600 can function as a brake light component 104, automated driving/assistance system 102, or the like. Computing device 600 can perform various monitoring functions as discussed herein, and can execute one or more application programs, such as the application programs or functionality described herein. Computing device 600 can be any of a wide variety of computing devices, such as a desktop computer, in-dash computer, vehicle control system, a notebook computer, a server computer, a handheld computer, tablet computer and the like.

Computing device 600 includes one or more processor(s) 602, one or more memory device(s) 604, one or more interface(s) 606, one or more mass storage device(s) 608, one or more Input/Output (I/O) device(s) 610, and a display device 630 all of which are coupled to a bus 612. Processor(s) 602 include one or more processors or controllers that execute instructions stored in memory device(s) 604 and/or mass storage device(s) 608. Processor(s) 602 may also include various types of computer-readable media, such as cache memory.

Memory device(s) 604 include various computer-readable media, such as volatile memory (e.g., random access memory (RAM) 614) and/or nonvolatile memory (e.g., read-only memory (ROM) 616). Memory device(s) 604 may also include rewritable ROM, such as Flash memory.

Mass storage device(s) 608 include various computer readable media, such as magnetic tapes, magnetic disks, optical disks, solid-state memory (e.g., Flash memory), and so forth. As shown in FIG. 6, a particular mass storage device is a hard disk drive 624. Various drives may also be included in mass storage device(s) 608 to enable reading from and/or writing to the various computer readable media. Mass storage device(s) 608 include removable media 626 and/or non-removable media.

I/O device(s) 610 include various devices that allow data and/or other information to be input to or retrieved from computing device 600. Example I/O device(s) 610 include cursor control devices, keyboards, keypads, microphones, monitors or other display devices, speakers, printers, network interface cards, modems, and the like.

Display device 630 includes any type of device capable of displaying information to one or more users of computing device 600. Examples of display device 630 include a monitor, display terminal, video projection device, and the like.

Interface(s) 606 include various interfaces that allow computing device 600 to interact with other systems, devices, or computing environments. Example interface(s) 606 may include any number of different network interfaces 620, such as interfaces to local area networks (LANs), wide area networks (WANs), wireless networks, and the Internet. Other interface(s) include user interface 618 and peripheral device interface 622. The interface(s) 606 may also include one or more user interface elements 618. The interface(s) 606 may also include one or more peripheral interfaces such as interfaces for printers, pointing devices (mice, track pad, or any suitable user interface now known to those of ordinary skill in the field, or later discovered), keyboards, and the like.

Bus 612 allows processor(s) 602, memory device(s) 604, interface(s) 606, mass storage device(s) 608, and I/O device(s) 610 to communicate with one another, as well as other devices or components coupled to bus 612. Bus 612 represents one or more of several types of bus structures, such as a system bus, PCI bus, IEEE bus, USB bus, and so forth.

For purposes of illustration, programs and other executable program components are shown herein as discrete blocks, although it is understood that such programs and components may reside at various times in different storage components of computing device 600, and are executed by processor(s) 602. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

EXAMPLES

The following examples pertain to further embodiments.

Example 1 is a method that includes selecting a night mode or day mode based on a pixel brightness in an image frame. The method includes detecting a region corresponding to a vehicle based on data from a range sensor when in a night mode or based on camera image data when in the day mode. The method includes classifying a brake light of the vehicle as on or off based on image data in the region corresponding to the vehicle.

In Example 2, the method of Example 1 includes determining one or more bounding boxes corresponding to brake lights of the vehicle in the region corresponding to the vehicle.

In Example 3, determining the one or more bounding boxes as in Example 2 includes extracting contours in the region corresponding to the vehicle selecting contours having a shape or size corresponding to a brake light shape or size.

In Example 4, classifying the brake light as in any of Examples 2-3 includes classifying based on image data corresponding to the one or more bounding boxes.

In Example 5, determining the one or more bounding boxes corresponding brake lights as in any of Examples 2-4 includes determining based on image data in a HSV format for the day mode and based on image data in a LAB format for the night mode.

In Example 6, classifying the brake light as in any of Examples 1-5 includes classifying using a neural network.

In Example 7, detecting the region corresponding to a vehicle based on data from a range sensor when in the night mode as in any of Examples 1-6 includes identifying a cluster of points in the range data corresponding to the vehicle and mapping a bounding box of the cluster of points to a corresponding image frame.

In Example 8, the range data in the night mode as in any of Examples 1-7 includes one or more of radar data, ultrasound data, and LIDAR data.

Example 9 is a system that includes a mode component, a vehicle region component, and a classification component. The mode component is configured to select a night mode or day mode based on a pixel brightness in an image frame. The vehicle region component is configured to detect a region corresponding to a vehicle based on data from a range sensor when in a night mode or based on camera image data when in the day mode. The classification component is configured to classify a brake light of the vehicle as on or off based on image data in the region corresponding to the vehicle.

In Example 10, a system as in Example 9 further includes a brake light region component configured to determine one or more bounding boxes corresponding to brake lights of the vehicle in the region corresponding to the vehicle.

In Example 11, a brake light region component as in Example 10 is configured to determine the one or more bounding boxes by extracting contours in the region corresponding to the vehicle and selecting contours having a shape or size corresponding to a brake light shape or size.

In Example 12, a classification component as in any of Examples 10-11 is configured to classify the brake light by classifying based on image data corresponding to the one or more bounding boxes.

In Example 13, a brake light region component as in any of Examples 10-12 is configured to determine the one or more bounding boxes based on image data in a HSV format for the day mode and based on image data in a LAB format for the night mode.

In Example 14, a classification component as in any of Examples 9-13 is configured to classify the brake light of the vehicle as on or off using a neural network.

In Example 15, a vehicle region component detecting the region corresponding to a vehicle based on data from a range sensor when in the night mode as in any of Examples 9-14 includes identifying a cluster of points in the range data corresponding to the vehicle and mapping a bounding box of the cluster of points to a corresponding image frame.

Example 16 is a computer readable storage media storing instructions that, when executed by one or more processors, cause the one or more processors to select a night mode or day mode based on a pixel brightness in an image frame. The instructions cause the one or more processors to detect a region corresponding to a vehicle based on data from a range sensor when in a night mode or based on camera image data when in the day mode. The instructions cause the one or more processors to classify a brake light of the vehicle as on or off based on image data in the region corresponding to the vehicle.

In Example 17, a computer readable media as in Example 16 further includes instructions that cause the one or more processors to determine one or more bounding boxes corresponding to brake lights of the vehicle in the region corresponding to the vehicle.

In Example 18, instructions cause the one or more processors to determine the one or more bounding boxes as in Example 17 by extracting contours in the region corresponding to the vehicle and selecting contours having a shape or size corresponding to a brake light shape or size. The instructions cause the one or more processors to classify the brake light based on image data corresponding to the one or more bounding boxes.

In Example 19, instructions cause the one or more processors as in any of Examples 16-18 to classify the brake light of the vehicle as on or off using a neural network.

In Example 20, detecting the region corresponding to a vehicle based on data from a range sensor when in the night mode as in any of Example 16-19 includes identifying a cluster of points in the range data corresponding to the vehicle and mapping a bounding box of the cluster of points to a corresponding image frame.

Example 21 is a system or device that includes means for implementing a method or realizing a system or apparatus in any of Examples 1-20.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium, which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. The terms "modules" and "components" are used in the names of certain components to reflect their implementation independence in software, hardware, circuitry, sensors, or the like. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

Further, although specific implementations of the disclosure have been described and illustrated, the disclosure is not to be limited to the specific forms or arrangements of parts so described and illustrated. The scope of the disclosure is to be defined by the claims appended hereto, any future claims submitted here and in different applications, and their equivalents.

What is claimed is:

1. A method comprising:
   clustering input range data based on density-based spatial clustering to generate a three-dimensional clustered object;
   receiving a classification from a neural network indicating whether the three-dimensional clustered object likely depicts a vehicle;
   corresponding the three-dimensional clustered object from the input range data with a region of interest of an input image; and
   determining whether the region of interest depicts a brake light based on data from the input image.

2. The method of claim 1, further comprising determining whether dimensions for the clustered object are within a size range corresponding with the vehicle; and
   providing the clustered object to the neural network in response to determining the dimensions for the clustered object are within the size range corresponding with the vehicle.

3. The method of claim 1, further comprising removing a ground plane from the input range data, and wherein the clustering the input range data occurs after removing the ground plane.

4. The method of claim 1, wherein the input range data comprises light detection and ranging (LIDAR) data captured by a LIDAR system of a parent vehicle;
  wherein the input image comprises image sensor data captured by a camera of the parent vehicle; and
  wherein the input range data and the input image are captured substantially simultaneously.

5. The method of claim 1, wherein the neural network is a deep neural network comprising a deep architecture trained to output a binary classification indicating whether the three-dimensional clustered object depicts the vehicle or does not depict the vehicle.

6. The method of claim 1, wherein corresponding the three-dimensional clustered object from the input range data with the region of interest of the input image comprises corresponding based on pixel locations for the region of interest of the input image.

7. The method of claim 1, further comprising converting pixel data for the region of interest of the input image to lightness and two-color channels (LAB) color space.

8. The method of claim 7, wherein determining whether the region of interest comprises the brake light comprises:
  extracting contours from the pixel data for the region of interest that is converted to the LAB color space;
  based on a shape and size of extracted contours, determining whether any brake light region exists within the pixel data for the region of interest.

9. The method of claim 8, further comprising, in response to identifying a brake light region of interest within the pixel data, providing the brake light region of interest to a neural network trained on a dataset of brake lights to classify the brake light as on or off.

10. The method of claim 9, further comprising receiving an output from the neural network indicating whether the brake light depicted within the region of interest is likely on or off.

11. The method of claim 1, further comprising:
  calculating an average pixel brightness of a plurality of pixels in the input image;
  determining whether the average pixel brightness exceeds or falls below a threshold value; and
  in response to the average pixel brightness falling below the threshold value, converting the input image to LAB color space.

12. The method of claim 1, further comprising:
  feeding the region of interest to a neural network trained on a dataset comprising a plurality of brake lights;
  receiving as output from the neural network an indication of whether the region of interest comprises a positive brake light that is turned on or a negative brake light that is not turned on.

13. The method of claim 1, wherein each of the input range data and the input image is captured by a camera of a parent vehicle, and wherein the method further comprises providing instructions to an automated driving/assistance system of the parent vehicle to execute a driving maneuver in response to determining whether the region of interest depicts the brake light.

14. The method of claim 1, wherein the input image is captured by a camera of a parent vehicle, and wherein the method further comprises:
  determining whether the brake light is on or off in response to determining the region of interest comprises the brake light; and
  in response to determining the brake light is on, providing a notification to a driver of the parent vehicle and/or an automated driving/assistance system of the parent vehicle;
  wherein the notification comprises an indication that the vehicle in front of the parent vehicle is braking.

15. A non-transitory computer readable storage medium storing instructions for execution by one or more processors, the instructions comprising:
  clustering input range data based on density-based spatial clustering to generate a three-dimensional clustered object;
  receiving a classification from a neural network indicating whether the three-dimensional clustered object likely depicts a vehicle;
  corresponding the three-dimensional clustered object from the input range data with a region of interest of an input image; and
  determining whether the region of interest depicts a brake light based on data from the input image.

16. The non-transitory computer readable storage medium of claim 15, wherein the instructions further comprise determining whether dimensions for the clustered object are within a size range corresponding with the vehicle; and
  providing the clustered object to the neural network in response to determining the dimensions for the clustered object are within the size range corresponding with the vehicle.

17. The non-transitory computer readable storage medium of claim 15, wherein the neural network is a deep neural network comprising a deep architecture trained to output a binary classification indicating whether the three-dimensional clustered object depicts the vehicle or does not depict the vehicle.

18. The non-transitory computer readable storage medium of claim 15, wherein the instructions are such that corresponding the three-dimensional clustered object from the input range data with the region of interest of the input image comprises corresponding based on pixel locations for the region of interest of the input image.

19. The non-transitory computer readable storage medium of claim 15, wherein the instructions further comprise converting pixel data for the region of interest of the input image to lightness and two-color channels (LAB) color space.

20. The non-transitory computer readable storage medium of claim 19, wherein the instructions are such that determining whether the region of interest comprises the brake light comprises:
  extracting contours from the pixel data for the region of interest that is converted to the LAB color space;
  based on a shape and size of extracted contours, determining whether any brake light region exists within the pixel data for the region of interest.

* * * * *